United States Patent
Kleven et al.

(10) Patent No.: US 6,539,981 B1
(45) Date of Patent: *Apr. 1, 2003

(54) FLOW TUBE HAVING A BONDING LAYER WITH A FLUOROPOLYMER LINING

(75) Inventors: Lowell A. Kleven, Eden Prairie, MN (US); Brad L. Lesmeister, Eagan, MN (US)

(73) Assignee: Rosemount Inc., Eden Prairie, MN (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/717,995

(22) Filed: Sep. 26, 1996

Related U.S. Application Data

(60) Provisional application No. 60/004,616, filed on Sep. 29, 1995.

(51) Int. Cl.[7] .................................................. F16L 9/14
(52) U.S. Cl. ...................... 138/143; 138/104; 138/146; 73/861.12; 73/861.15; 427/447; 427/456; 427/233; 427/234; 427/236
(58) Field of Search ................................. 427/447, 456, 427/233, 234, 236; 138/141, 143, 145, 146, DIG. 3, DIG. 6, DIG. 7, 104; 73/861.12, 861.15

(56) References Cited

U.S. PATENT DOCUMENTS

| | | | |
|---|---|---|---|
| 2,783,173 A | 2/1957 | Walker et al. ................. 154/83 |
| 3,750,468 A | 8/1973 | Grauer ......................... 73/194 |
| 4,181,013 A | 1/1980 | Wada ........................... 73/194 |
| 4,253,340 A | 3/1981 | Schmoock ................ 73/861.12 |
| 4,269,071 A | 5/1981 | Wada ...................... 73/861.12 |
| 4,279,166 A | 7/1981 | Gryn et al. ............... 73/861.12 |
| 4,312,961 A | * 1/1982 | Winegar et al. ................ 525/4 |
| 4,388,834 A | 6/1983 | Schmoock ............... 73/861.12 |
| 4,577,664 A | 3/1986 | Takahashi et al. .......... 138/149 |
| 4,790,195 A | * 12/1988 | Feller ....................... 73/861.77 |
| 5,093,403 A | * 3/1992 | Rau et al. .................... 524/404 |
| 5,207,248 A | 5/1993 | Seki et al. .................. 138/145 |
| 5,271,977 A | 12/1993 | Yoshikawa et al. ........ 428/35.9 |
| 5,341,849 A | 8/1994 | Mang ......................... 138/133 |

FOREIGN PATENT DOCUMENTS

| | | | | |
|---|---|---|---|---|
| DE | 25 05 427 | 8/1976 | | |
| DE | 43 02 158 | 7/1994 | | |
| DE | 43 27 876 | 2/1995 | | |
| EP | 0 036 513 | 9/1981 | | |
| EP | 0 116 875 | 8/1984 | | |
| GB | 2 068 122 | 8/1981 | | |
| GB | 2277466 A | * 11/1994 | ................. 427/453 |
| JP | 5-26705 | 2/1993 | | |
| JP | 5-72007 | 3/1993 | | |
| JP | 6-102071 | 4/1994 | | |
| JP | 6-109503 | 4/1994 | | |
| JP | 7-35588 | 2/1995 | | |

OTHER PUBLICATIONS

Brochure from DuPont, TEFZEL Technical Information, publication date at least as early as Sep. 1, 1994, pp. 1–4.

* cited by examiner

*Primary Examiner*—Katherine A. Bareford
(74) *Attorney, Agent, or Firm*—Westman, Champlin & Kelly, P.A.

(57) ABSTRACT

A flow tube has a metal outer tube and is lined with an ETFE fluoropolymer that is resistant to corrosive chemicals and mechanical damage even at high temperatures. The inner surface of the metal tube is coated with a bonding metal that can be securely bonded to the outer metal tube and also forms a strong bond with ETFE fluoropolymer. After the bonding metal has been applied, a layer of a desired thickness of the ETFE fluoropolymer is molded in place to form an inner liner for the flow tube.

3 Claims, 2 Drawing Sheets

FLOW TUBE HAVING A BONDING LAYER WITH A FLUOROPOLYMER LINING

CROSS REFERENCE TO PROVISIONAL APPLICATION

This application claims priority on U.S. Provisional Application No. 60/004,616 filed Sep. 29, 1995, under 35 U.S.C. §119.

BACKGROUND OF THE INVENTION

A flow tube is lined with ETFE fluoropolymer, to resist corrosive effects of fluids being carried in the tube. The tube surface is preferably first coated with a metal having a greater affinity for the ETFE fluoropolymer than carbon steel or stainless steel, prior to applying the polymeric coating.

An ethylenetetrafluoroethylene copolymer (an ETFE fluoropolymer) is made by Dupont Company is sold under the trademark TEFZEL and made and sold under various names by other companies. The polymer is highly chemically resistant and mechanical abrasion resistant up to at least 300° F. This resistance to both chemicals and mechanical impact makes it an excellent lining material for applications requiring protection of metals from chemicals or mechanical wear.

TEFZEL, that is, ETFE fluoropolymer, exhibits good room temperature bond strength to many types of metals, including 304 stainless steel, Hastalloy, carbon steel and other metals. This bond exhibits a tendency to weaken with increasing temperature and exposure to water. A combination of both high temperature and exposure to water tends to rupture the bond of the ETFE fluoropolymer to the metal rather quickly. The bond loss is caused by water permeating the ETFE fluoropolymer and attacking the bond between the ETFE and the metal wall.

SUMMARY OF THE INVENTION

The present invention relates to providing an ETFE fluoropolymer coating solidly bonded to metal, useful in many types of pipes and tubes, including flow meter tubes. The tubes are usually made with carbon steel or stainless steel. Direct application of polymers to such tubes does not provide a bond that is sufficiently resistant to rupture to work satisfactorily. Bonding a thin layer of another metal to the base tube material, which exhibits a strong bond to ETFE fluoropolymer sold by Dupont Company under the trademark TEFZEL and made and sold by various other companies. The coating provides a durable, damage and rupture resistant layer in the tube. In particular, the process used for coating the interior of a flow tube includes adding a thin deposited aluminum layer on the inner surface of a stainless steel tube, and then coating the tube inner surface by rotationally molding or molding by melting the ETFE fluoropolymer layer on the inner surface for resistance to chemicals and mechanical damage.

In one form of the invention, capacitor plates and sometimes combined with shield plates, driven to the same electrical potential as the electrodes, are supported in the ETFE liner in a suitable manner for use in a magnetic flowmeter and are connected to circuitry for providing an indication of flow rate of a liquid through the tube.

It is important to have a surface bond that retains the ETFE fluoropolymer layer in place, even upon quite wide temperature differentials. The coefficient of expansion of ETFE, for example, is approximately ten times that of most metals, and so that the metal to ETFE fluoropolymer bond is stressed upon cooling to room temperature after the ETFE has been heated and molded in place, and when cooled after a flow pipe lined with the ETFE has been used in high temperature environments, particularly when water is present. The liner will thus be prevented from forming a gap that water, which permeates the ETFE, will form in and collapse the liner upon heating and generating a steam pressure between the liner and tube wall. By applying a well bonded coating of metal that has affinity for, or that bonds well with, the ETFE fluoropolymer, such as aluminum, a long life bond is created so that the inherent properties of the polymer, such as resistance to abrasion and chemical attack are provided for a flow meter.

DETAILED DESCRIPTION OF THE PREFERRED EMBODIMENTS

Figure 1:
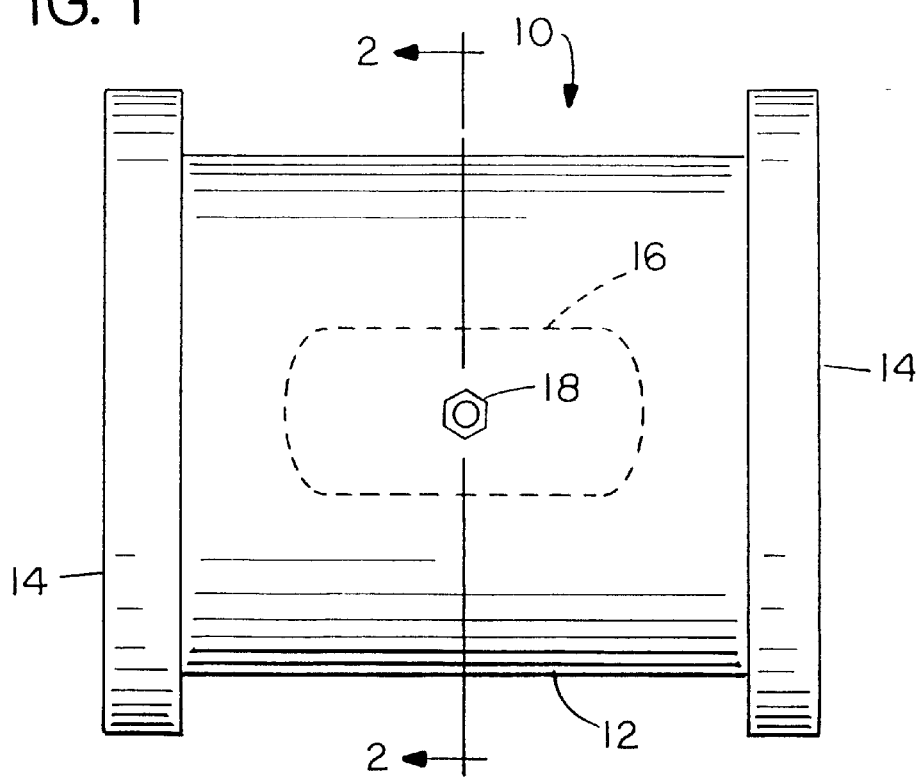
FIG. 1 is a side elevational view of a typical flow meter tube having an internal lining or coating made according to the present invention.
Figure 2:
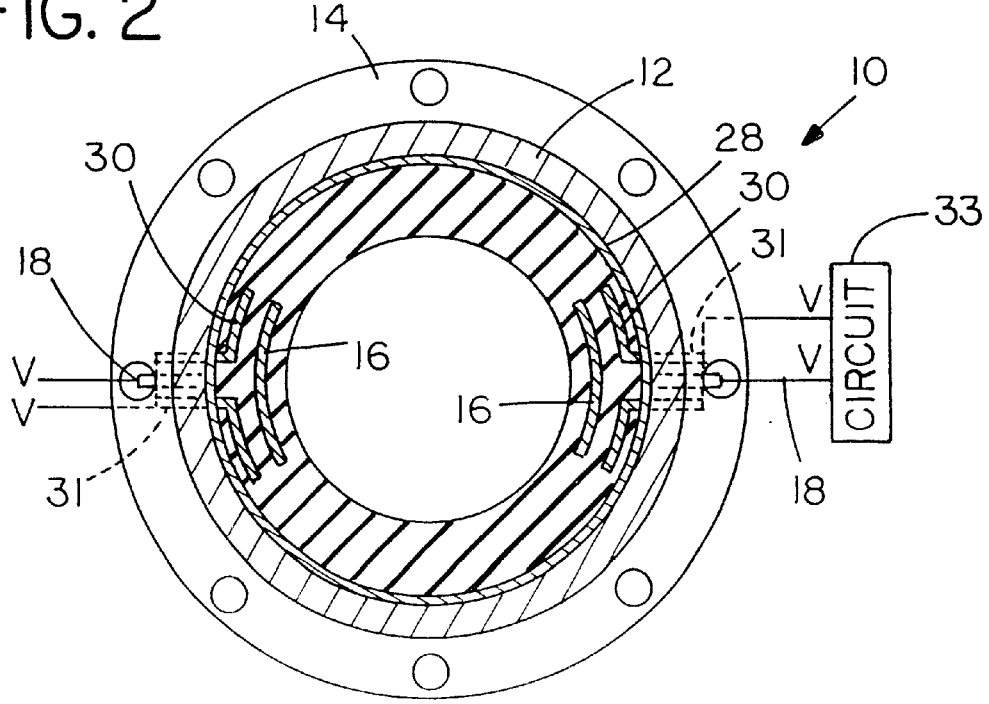
FIG. 2 is a sectional view taken as line 2—2 in FIG. 1.

In the figures, a capacitively coupled magnetic flow meter tube indicated generally at 10 is constructed with an outer metal tube 12 that is preferably stainless steel or some other structurally sound non magnetic metal that is rugged corrosion resistant and can be attached in place with suitable end flanges 14 into a flow pipe carrying fluids ranging from room temperature water to hot, highly corrosive chemicals. The flow meter tube is made with suitable capacitor plates 16 and shield plates 30 driven to the same voltage as the capacitor plates 16 may also be used insulated from and supported in a suitable manner relative to the metal tube 12 and capacitor plates 16. Leads 18 are provided for connection of the capacitor plates 16 to sensing circuitry, and the shield plates to a voltage potential which is the same as the voltage of the capacitor plates as is well known. Conductive tubes 31, surrounding the leads 18 are used to connect the shield plates to the circuitry 33. The capacitor plates 16, which are on opposite sides or across the flow tube bore or passage 20 from each other, and the shield plates 30 are mounted or embedded in an insulating material liner 26 bonded on the inner surface 22 of the tube (FIG. 3).

The present invention includes the liner 26 of ETFE fluoropolymer. This liner 26 as shown, embeds or surrounds the capacitor plates 16 and shield plates 30.

In order to obtain a strong, long life bond of the ETFE fluoropolymer material forming liner layer 26 to the inner surface 22 of the metal tube 12, the inner surface of the stainless steel tube 12 is treated to include a thin film or layer 28 forming a substrate surface that bonds well to the ETFE fluoropolymer. As shown, the layer of bonding material is a thin layer of aluminum.

Figure 3:
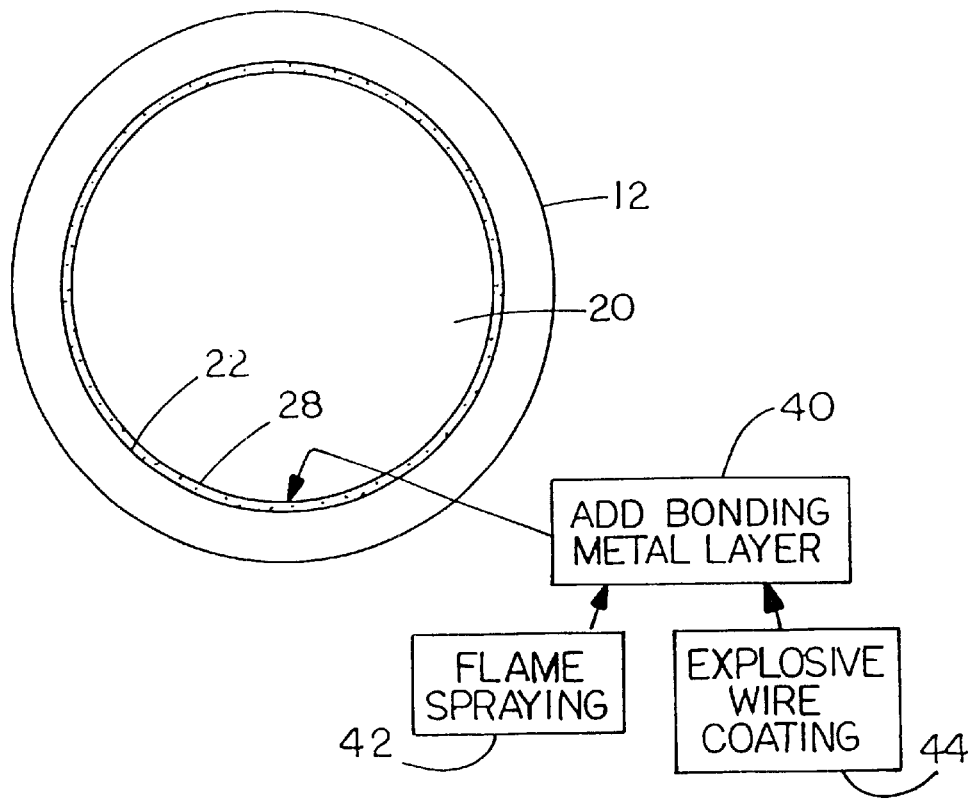
FIG. 3 is an end view schematically illustrating a flow tube during a first step in the process of lining the flow tube according to the present invention.

The bonding material layer 28 is applied as represented by step 40 in FIG. 3 by known techniques, such as flame spraying 42 to add a very thin layer to form a highly secure bond to the stainless steel tube 12. Other techniques for applying a thin layer of aluminum to the inner surface 22 of the tube include vacuum deposition, sputtering, vapor deposition, explosive wire coating represented by 44, or the like. The process is selected to insure a thin, well bonded metal layer 28 having a surface for receiving the ETFE polymer. Explosive wire coating 44 is a well known technique and well suited for this application. The aluminum bonding material layer is permitted to oxidize, so that a thin film of aluminum oxide is exposed for the subsequent bonding of the ETFE fluoropolymer layer 26.

Figure 4:
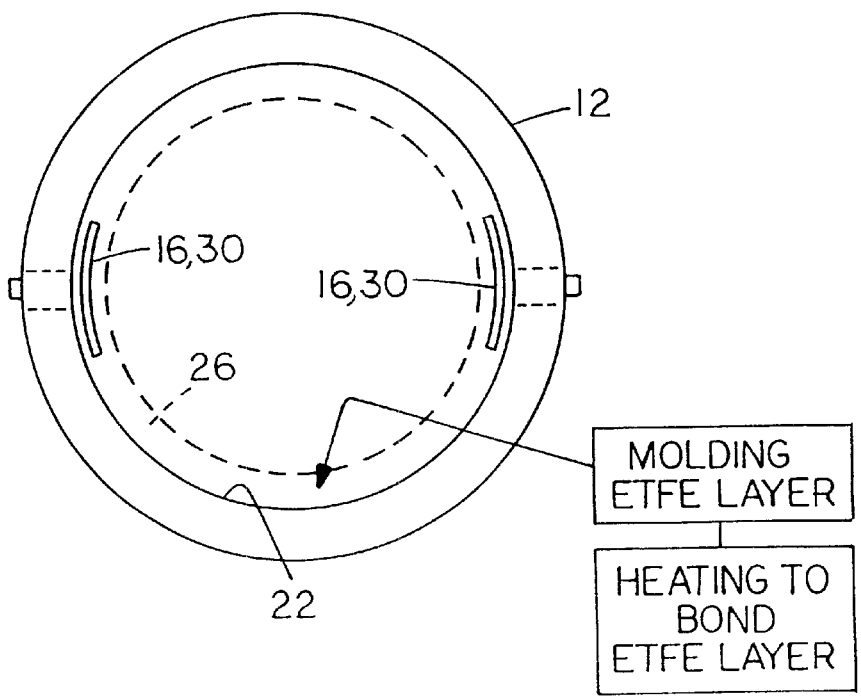
FIG. 4 is an end view of a flow tube and a schematic representation of a final process for applying a ETFE fluoropolymeric lining to a tube.

The capacitor plates 16 and shield plates 30 are mounted in the tube and, as shown in FIG. 4, the ETFE fluoropolymer is molded in a layer onto the interior of the metal tube 12 to form the ETFE fluoropolymer layer 26. Rotational molding is a known technique for bonding layers of ETFE fluoropolymer to metal, or other materials. Other molding processes may be used where the ETFE is molded in place in the tube, for example by spin molding, or the ETFE can be molded as a sleeve and slipped into the tube. As an optional step the tube and material are heated high enough to activate the bond between the ETFE resin and the aluminum bonding layer. The ETFE has to be heated to or very near the melting point for bonding, and the tube, which is a good heat conductor is heated to the desired temperature. If a premolded tube of ETFE is used, an internal pressure will force the heated material toward the bonding layer of aluminum. After this process, the tube is processed as any other flow tube and is placed into use as desired.

ETFE fluoropolymer, as stated, has a substantially greater coefficient of expansion than most metals so that the ETFE fluoropolymer to metal bond is stressed upon cooling from the rotationally molding process temperature, which is usually in the range of 580° F. to 590° F. Cooling down to room temperature causes a substantial amount of stress on the bond which tends to pull the ETFE fluoropolymer layer from the surface 22 of the metal tube 12. However, with the bond formed between the thin bonding material layer and the ETFE fluoropolymer the bond is not destroyed. The capacitor plates 16 and shield plates 30 remain in position, and no water or other materials can get between the polymer liner 26 and the metal tube 12.

If in fact the liner 26 loosens from the metal tube 12, calibration factors shift from the inside diameter change which is unacceptable. The shifts make the flow meter output inaccurate. The capacitor plates 16 and shield plates 30 that are embedded in the liner 26 during the rotational molding will move with the liner 26, if the liner 26 separates from the metal, and no longer will be held rigidly in place. This will cause signal noise due to motion of the electrode during pressure pulsations, which in turn causes inaccuracy.

The capacitor plates 16 and shield plates 30 can be made of stainless steel, Hastalloy or other metals, but to improve adhesion of the ETFE fluoropolymer to the plates, these plates are preferably made from aluminum coated materials or of aluminum and aluminum alloys. This will prevent the signal noise from loss of bond between the ETFE fluoropolymer and the plate.

Again the deposition of the thin layer of bonding metal or bonding material is done by known techniques such as flame spraying, vacuum deposition, vapor depositing, sputtering, and other known techniques such as an explosive wire coating, which will provide a coating on the interior of the metal tube and additionally to the capacitor and shield plates with a well bonded metal that will in turn bond well to the ETFE fluoropolymer.

The material that is used for the bonding coating is preferably aluminum, which exhibit good bonding properties relative to the ETFE fluoropolymer.

The polymer layer 26 is generally in the range of approximately one-sixteenth inch for small tubes (one-half to one inch diameter) and to one-fourth inch large tubes (twenty to thirty-six inch diameter) and is not merely a very thin insulating coating, but rather, a coating that is used for resisting chemical attack and mechanical abrasion.

Solid aluminum tubes can be used, but are not preferred because of low chemical resistance and interference with the magnetic field due to eddy currents caused by its low resistivity. Other forms of depositing aluminum can be used. The technique will work for traditional magnetic flowmeters having metal electrodes that contact the fluid, valves, lined pipe or tubing for carrying various fluids, lined tanks and with all types of flowmeters. The coating of ETFE fluoropolymer, adhered to a layer of bonding material, which is bonded to a support structure, permits the tube or tank to be built from cheaper, less chemically resistant metals.

Although the present invention has been described with reference to preferred embodiments, workers skilled in the art will recognize that changes may be made in form and detail without departing from the spirit and scope of the invention.

What is claimed is:

1. A flow tube for carrying corrosive liquids comprising a metal tube with an inner surface of the tube having a coating of a separate bonding metal applied thereto and consisting of aluminum, and with an inner liner of ethylene tetrafluoroethylene copolymer (ETFE) bonded on an exposed surface of the coating, a pair of capacitor plates embedded in and bonded to the inner liner; and a pair of shield plates between the capacitor plates and the inner surface of the metal tube, and a voltage source connected to the shield plates to maintain the shield plates at substantially the same voltage as the capacitor plates.

2. The flow tube of claim 1, wherein the capacitor plates and shield plates are made of aluminum.

3. The flow tube of claim 1, wherein the capacitor plates and shield plates are made of metal and coated with aluminum.

\* \* \* \* \*